LIGHT SOURCE

Filed April 25, 1962 5 Sheets-Sheet 1

INVENTOR.
Alfred J. Thelen
Joseph H. Apfel
BY
Flehr and Swain
Attorneys

INVENTOR.
Alfred J. Thelen
BY Joseph H. Apfel
Fleher and Swain
Attorneys

INVENTOR.
Alfred J. Thelen
BY Joseph H. Apfel
Flehr and Swain
Attorneys

LIGHT SOURCE

Filed April 25, 1962

INVENTOR.
Alfred J. Thelen
Joseph H. Apfel
BY
Flehr & Swain
Attorneys

May 25, 1965 A. J. THELEN ETAL 3,185,834

LIGHT SOURCE

Filed April 25, 1962 5 Sheets-Sheet 5

INVENTOR.
Alfred J. Thelen
BY Joseph H. Apfel
Flehr and Swain
Attorneys 3,185,834

LIGHT SOURCE

Alfred J. Thelen and Joseph H. Apfel, Santa Rosa, Calif., assignors to Optical Coating Laboratory, Inc., Santa Rosa, Calif., a corporation of Delaware
Filed Apr. 25, 1962, Ser. No. 190,139
12 Claims. (Cl. 240—41.35)

This invention relates to a light source and more particularly to a light source which simulates the intensity and spectral distribution of sunlight in space.

At the present time, there is a need for a solar simulator to test and evaluate in the laboratory parts and systems which are used in space under space flight conditions. The use of such a light source or solar simulator is of particular importance for the production testing of silicon solar cells which are utilized for satellite power supplies. As is well known, the conversion efficiency of silicon solar cells is significantly different when tested with tungsten lamps adjusted to the same intensity as sunlight rather than with direct sunlight. Also, the conversion efficiency of silicon solar cells is significantly different in space than it is on the earth's surface. Silicon solar cells are used to convert sunlight into electrical power which is then used to power the transmitters and other equipment on the satellites. It is very important to be able to judge or measure the power output from the silicon solar cells in order to properly design the power system for the satellite. Heretofore, attempts have been made to test solar cells by going to mountain tops and measuring the output from the silicon solar cells, while at the same time making spectral measurements of the spectral distribution of the sunlight and then interpolating from these results to arrive at the conditions in outer space. As is readily apparent, this is very inconvenient because it is desirable to be able to test the silicon solar cells in the laboratory with the use of a light source which simulates sunlight rather than going to a mountain top. Various attempts have been made to produce a good laboratory light source duplicating the sun's energy. Certain approaches have used special carbon arc sources and others have used tungsten lamps with liquid filters. Neither of these solutions has proved to be satisfactory because each exhibits a serious disadvantage. In the case of the carbon arc, it is very difficult to achieve stable illumination. The use of tungsten lamps with liquid filters is rather impractical for continuous use because they heat due to absorption; they are bulky; there is a possibility of deterioration under strong illumination; and filters with the precisely correct absorption are not available. Although tungsten lights can be made as bright as the sun, they give a very poor approximation to the solar spectrum because they provide a completely different spectral distribution. Other attempts have been made by utilizing Xenon arc lamps and Xenon mercury arc lamps. Others have attempted to use a combination of a Xenon arc and a tungsten lamp by illuminating the area directly from both lamps. The latter approach has been found to be unsatisfactory because the Xenon arc has a very high unwanted intensity in the infrared which does not conform to the output of the sun. It, therefore, can be seen that there is a need for a light source which correctly simulates the intensity and spectral distribution of sunlight in space.

In general, it is an object of the present invention to provide a light source which simulates the intensity and spectral distribution of sunlight in space.

Another object of the invention is to provide a light source of the above character which has stability with respect to time to allow quantitative measurements to be made of the output.

Another object of the invention is to provide a light source of the above character which gives a uniform distribution of energy over a predetermined plane test area.

Another object of the invention is to provide a light source of the above character in which the output from tungsten and Xenon arc sources are utilized and combined by use of cold mirrors.

Another object of the invention is to provide a light source of the above character in which a mirror reflects the shorter wavelengths from the Xenon arc and transmits the unwanted longer wavelengths from the Xenon arc.

Another object of the invention is to provide a light source of the above character in which a combining mirror transmits the longer wavelengths from the tungsten lamp and reflects the shorter wavelengths from the tungsten lamp.

Another object of the invention is to provide a light source of the above character which, by the use of shaping or trimming filters, gives an output that closely represents the spectral distribution of the sun outside of or at the edge of the earth's atmosphere.

Another object of the invention is to provide a light source of the above character which is usable throughout the 300 to 1200 millimicron range.

Another object of the invention is to provide a light source of the above character which can be relatively economically manufactured.

Another object of the invention is to provide a light source of the above character which is relatively reliable in operation.

Additional objects and features of the invention will appear from the following description in which the preferred embodiments are set forth in detail in conjunction with the accompanying drawings.

Referring to the drawings.

Figure 9:
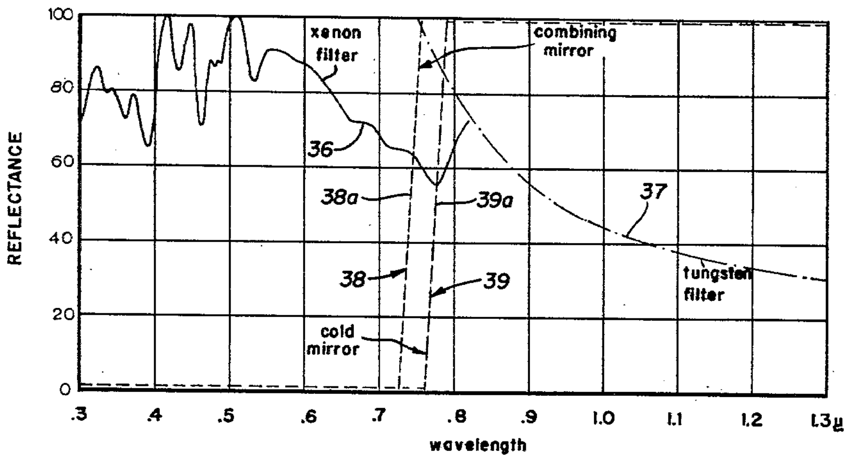

FIGURE 9 shows a plurality of curves which depict the spectral regions covered by the cold mirrors 21 and 22 and in particular the transitions provided by the cold mirrors and their relationship to the spectral regions covered by the outputs from the Xenon lamp 11 and the tungsten lamp 12 after they have passed through the Xenon and tungsten filters.

Figure 1:
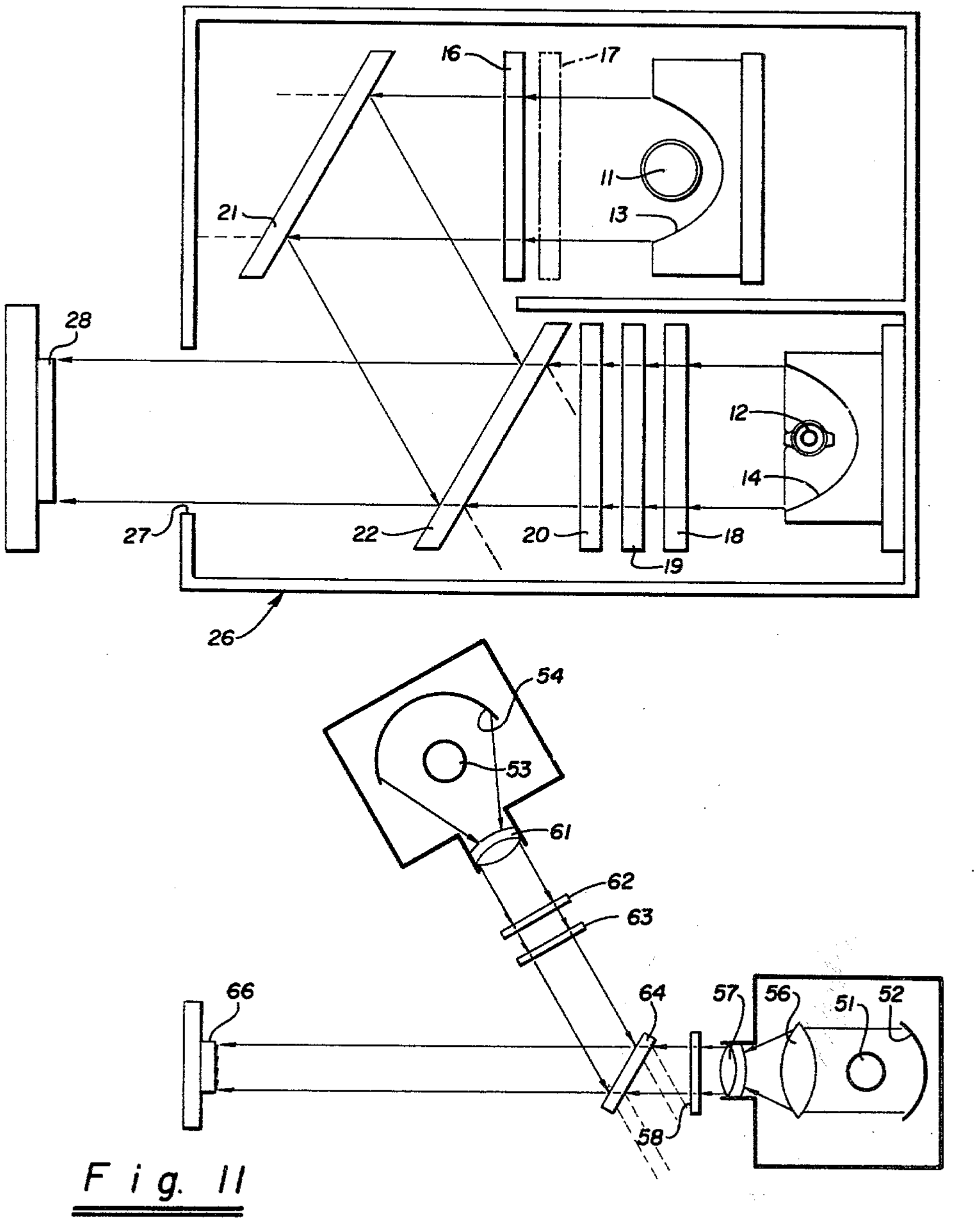
FIGURE 1 is an illustration, partially schematic, of a light source incorporating our invention which is useful as a solar simulator.
Figure 10:
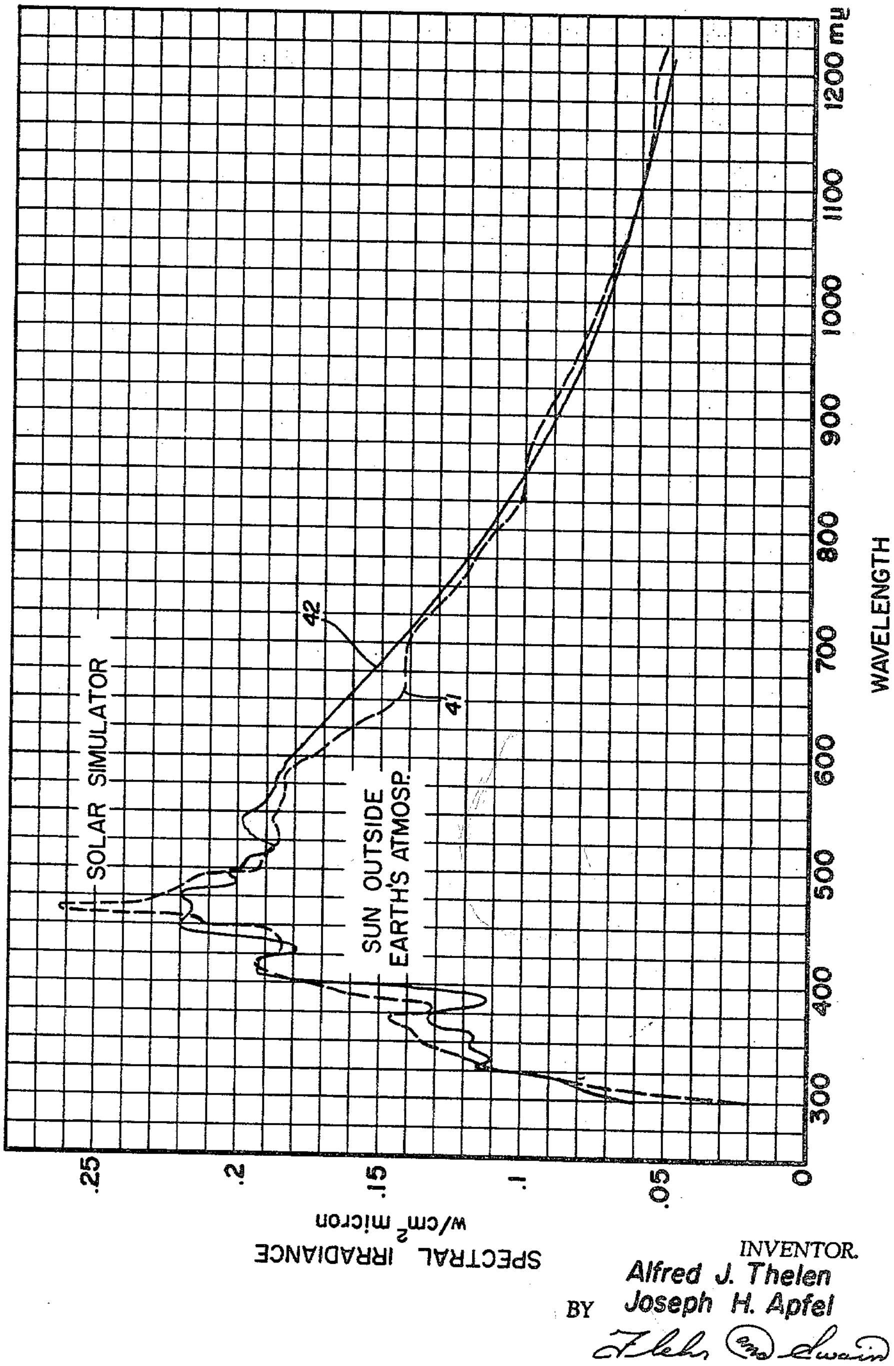

FIGURE 10 shows the spectral irradiance of the solar simulator as shown in FIGURE 1 in comparison with the spectral irradiance of the sun outside the earth's atmosphere in watts per centimeter squared.

FIGURE 11 is an illustration of another embodiment of our light source utilizing a single combining cold mirror.

In general, our light source is utilized for providing a light output which illuminates a test area with radiation equal in intensity and spectral content to that of a light source it is desired to simulate. The light source consists of a first light source which has an output which covers a predetermined spectral region and a second light source which has an output which also covers a predetermined spectral region but which is different from the spectral region covered by the first light source. Means is provided for combining the outputs from the two light sources by combining desired wavelengths from the outputs of the first and second light sources to provide the desired light output.

As can be seen from FIGURE 1 of the drawings, our light source or solar simulator consists of two separate light sources 11 and 12. Each of the light sources has a predetermined spectral distribution which differs from the spectral distribution of the other light source. In order to provide a solar simulator, it has been found desirable to utilize a Xenon lamp for the light source 11 to provide the radiation shorter than 650 millimicrons. As is well known to those skilled in the art, the Xenon arc provides a fairly smooth output in the ultraviolet and visual range. The output curve is not too rugged, and below 600 millimicrons it gives a fairly good representation of sunlight in and of itself. The Xenon arc lamp can be of any suitable type such as the Osram XBO 450 high pressure Xenon arc lamp manufactured by Osram of Germany, or a similar type manufactured by the General Electric Company in the United States of America.

For the light source to provide radiation of a wavelength longer than 650 millimicrons, we have found it desirable to utilize a suitable tungsten lamp such as the type DXL 625 watt 118 volt movie lamp manufactured by Sylvania. The use of such a lamp for the source 12 is desirable because the lamp has a very high intensity and operates at a very high temperature. As is well known to those skilled in the art, the tungsten lamp has a relatively smooth spectral output curve which has a peak depending upon the temperature at which the lamp is operating ranging from 900 to 1200 millimicrons. Thus, it can be said that the tungsten lamp is too rich in the infrared region.

Means is provided for each of the light sources for reflecting the light from the source and consists of 180° reflectors 13 and 14, respectively. These reflectors are formed in a manner well known to those skilled in the art to give good uniformity at a specific range. The reflectors can be formed of metal and overcoated with aluminum to increase reflectivity.

Figure 8:
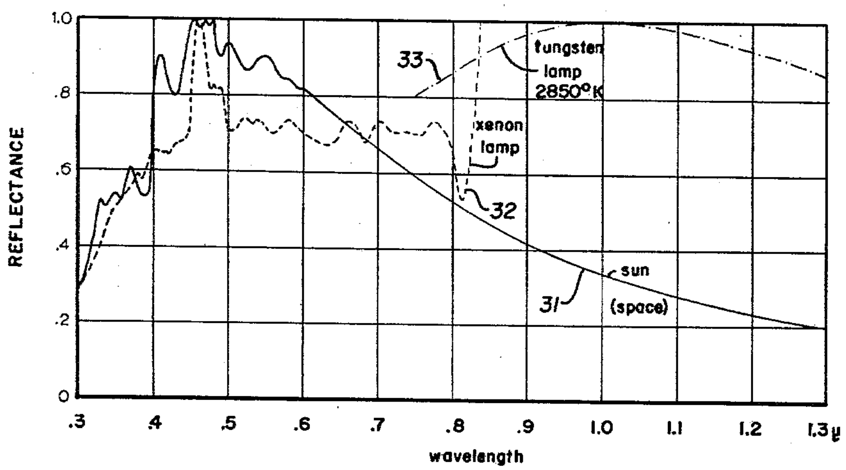
FIGURE 8 shows a plurality of curves and in particular shows the spectral regions covered by the output from the Xenon lamp 11 and the tungsten lamp 12 in comparison to the spectral region covered by the sun in space.

The radiations from the Xenon source 11 which have the spectral distribution shown by the dashed line in FIGURE 8 pass through a Xenon shaping filter 16. Another Xenon shaping filter 17 is indicated in dot and dash lines. However, in this embodiment, only one Xenon shaping filter is required because two cold mirrors as hereinafter described reduce the reflectivity in the region below 400 millimicrons as hereinafter described. The Xenon filter is substantially conventional and is of a type well known to those skilled in the art. In general, it consists of a quartz substrate. The substrate must be quarts because it must transmit ultraviolet. On the quartz substrate, there is deposited a quarter wave of zirconium oxide ($ZrO_2$) and a quarter wave of magnesium fluoride ($MgF_2$). The quarter wave of zirconium oxide has a design wavelength of 700 millimicrons, whereas the quarter wave of magnesium fluoride has a design wavelength of 350 millimicrons. This Xenon filter substantially reduces the energy of the Xenon arc lamp in the 500 to 700 millimicron region to make the light from the Xenon arc lamp more nearly simulate that of the sun in space.

Figure 4:
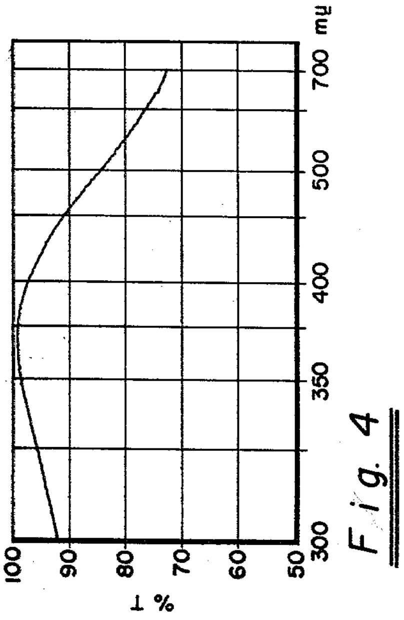
FIGURE 4 is a curve showing the transmission characteristics of the Xenon filter 17 shown in FIGURE 1.

The transmission characteristics of a Xenon shaping filter utilized in one embodiment of our invention is shown in the curve in FIGURE 4. The light is filtered by the Xenon filter 16 to provide a spectral content which more nearly matches that of the sun in space.

Figure 2:
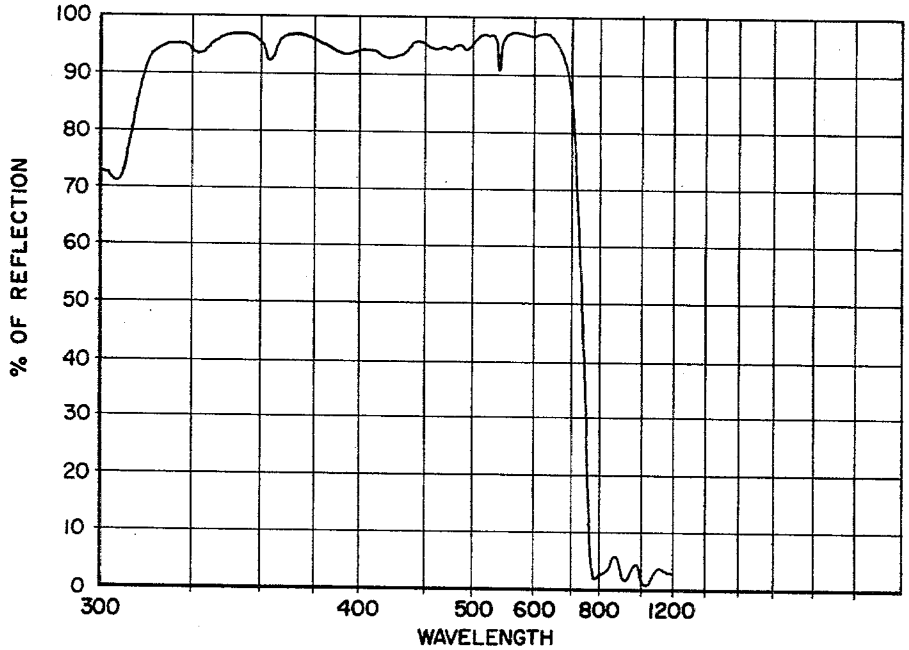
FIGURE 2 is a curve showing the reflection characteristics of the cold mirror 21 shown in FIGURE 1.

After the radiation from the Xenon source 11 has passed through the shaping filter 16, it strikes a cold mirror 21. The cold mirror 21 is of a type described in copending application Serial No. 190,119, filed April 25, 1962, in the name of Alfred J. Thelen and entitled "Wide Band Cold Mirror." The desired spectral portion (the shorter wavelengths) of the radiations from the Xenon source 11 is reflected by the cold mirror 21 as shown in FIGURE 1, whereas the undesired spectral portion (the longer wavelengths) is transmitted by the cold mirror and is not used in the apparatus. The reflection characteristics of cold mirror 21 utilized in one embodiment of our invention are shown in FIGURE 2.

Figure 5:
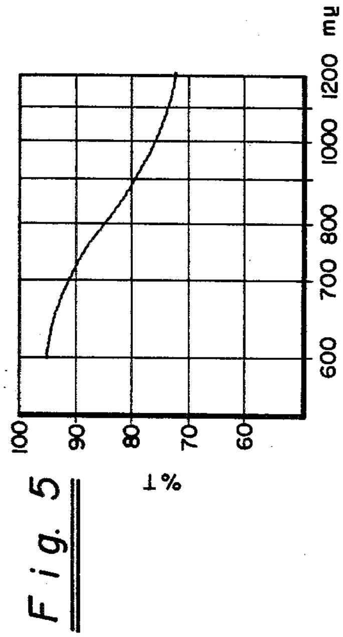
FIGURE 5 is a curve showing the transmission characteristics of the tungsten filter 19 shown in FIGURE 1.
Figure 7:
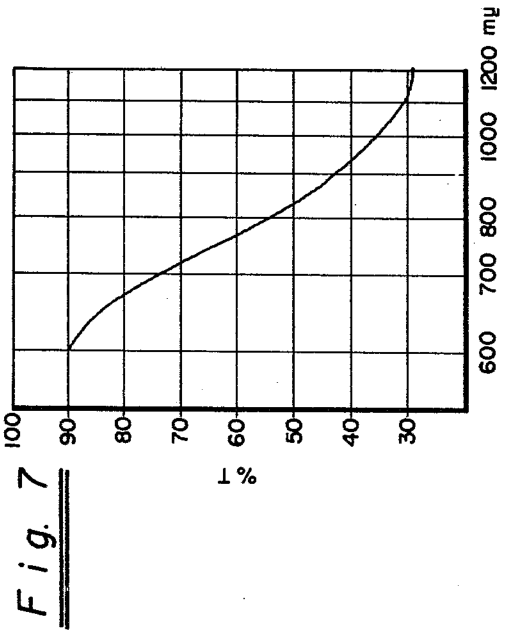
FIGURE 7 is a curve showing the combined transmission characteristics of the tungsten filters 19 and 20 in series.
Figure 6:
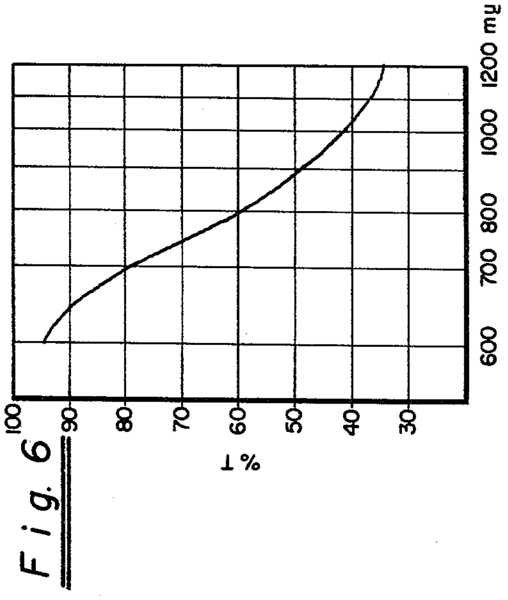
FIGURE 6 is a curve showing the transmission characteristics of the tungsten filter shown in FIGURE 1.

The radiations from the tungsten source 12 pass through a partially opaque attenuator 18 which is utilized to increase the uniformity of the output from the tungsten source. The attenuator consists of a quartz plate with four vertical lines of platinum located near the center of the plate. This removes the "hot spot" which otherwise would appear in the test plane. The tungsten beam then passes through a pair of tungsten filters 19 and 20. These tungsten filters are also used to achieve a spectral content which more closely simulates the sun in space. The filters consist of multi-layer coated glass windows of the type described in copending application Serial No. 190,002, filed April 25, 1962, in the name of Alfred J. Thelen and entitled "Color Correction Filter." The transmission curves for such filters used in one embodiment of our invention are shown in FIGURES 5 and 6. The transmission characteristic of the tungsten filters 19 and 20 in series in this same embodiment of our invention are shown in FIGURE 7.

After the tungsten light beam has passed through the shaping filters 19 and 20, the light beam strikes a cold mirror 22 which is also of the type described in copending application Serial No. 190,119, filed April 25, 1962, in the name of Alfred J. Thelen and entitled "Wide Band Cold Mirror." This cold mirror transmits the desired spectral portion (the longer wavelengths) of the tungsten beam and reflects the undesired spectral portion (the shorter wavelengths). The cold mirror 22 serves an additional function in that it reflects the spectral portion of the Xenon beam which has been reflected by the cold mirror 21 and combines it with the tungsten beam. The combined beam passes through an opening 27 provided in a case 26 enclosing the apparatus. This combined beam illuminates a plane test area 28, as hereinafter pointed out, with a radiation which is equal in intensity and spectral content to that provided by the sun at the edge of the earth's atmosphere.

Figure 3:
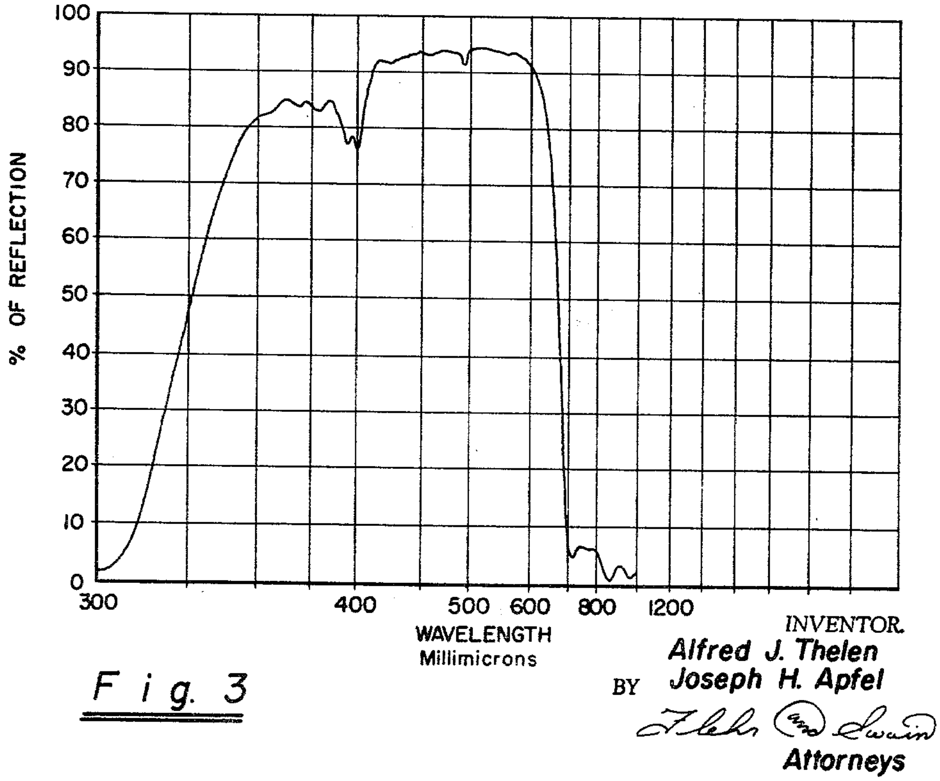
FIGURE 3 is a curve showing the reflection characteristics for the cold mirror 22 shown in FIGURE 1.

The reflection curve for the cold mirror 22 utilized in one embodiment of our invention is shown in FIGURE 3. It will be noted that the reflection curves shown in FIGURES 2 and 3 are similar. Both have relatively high reflectivity (approximately 96%) from 300 millimicrons and the cold mirror 21 has such a high reflectivity up to approximately 750 millimicrons, cold mirror 22 has such a high reflectivity up to approximately 650 millimicrons, and that above these wavelengths both cold mirrors have relatively high transmission. It can also be seen from the curves for the cold mirrors that there is a relatively sharp transition from high reflection to high transmission which is used to great advantage as hereinafter explained.

These cold mirrors 21 and 22 are actually filters. They are conventionally referred to as "cold mirrors" because they appear to be normal metallic reflectors even though they transmit infrared very efficiently.

As pointed out above, the cold mirror 21 has a higher cut-off wavelength (approximately 750 millimicrons) than does cold mirror 22 (approximately 650 millimicrons)

in order to avoid any squaring of the light beams which, if permitted to occur, would cause holes in the light output from our apparatus.

From the arrangement shown in FIGURE 1, it will be noted that the light sources 11 and 12 and the cold mirrors 21 and 22 are arranged in such a manner that the light beams from the light source strike the cold mirror 22 at the same angle of incidence. This eliminates the problem of closely matching the cut-out at transition points.

In the arrangement shown in FIGURE 1, it will be noted that the Xenon arc radiation is reflected twice, that is, by the cold mirror 21 and also by the cold mirror 22. This double reflection substantially reduces the intensity of the very strong red (800–1000 millimicrons) lines from the Xenon source to a negligible fraction of the total output. This spectral region is not completely eliminated by the cold mirrors 21 and 22 because, as can be seen from the curves in FIGURES 2 and 3, there is still some reflection by both cold mirrors in the 800–1000 millimicron region.

The Xenon source 11 and the tungsten lamp 12 are energized from suitable stable power supplies (not shown) of a type well known to those skilled in the art.

In FIGURE 8, there are shown three curves. The solid line curve 31 represents the spectral distribution of the sun in space outside the earth's atmosphere as known at the present time and as described in an article by F. S. Johnson entitled "Solar Concept" published in 1954 in the Journal of Meteorology, vol. 11, pages 431–439, now commonly called Johnson's Curve. The dashed line 32 represents the spectral distribution of the Xenon arc lamp. However, it will be noted that the spectral distribution of the arc lamp is only shown up to approximately 825 millimicrons because of the particular interest in one embodiment of our invention. The dash-dot line 33 gives the spectral distribution for the tungsten lamp operating at a temperature of 2850° K.

From these curves in FIGURE 8, it can be seen that the Xenon arc lamp and the tungsten lamp do not of themselves very closely approximate the spectral distribution of the sun in space. It is for this reason that the additional means in the form of the shaping filters and the cold mirrors hereinbefore described are required to obtain a better matching of the spectral distribution of the sun in space. The result of utilizing such shaping filters and cold mirrors is shown in FIGURE 9. The solid curve 36 represents the output of the Xenon arc lamp after it has passed through the Xenon shaping filter 16. As can be seen from comparing curves 32 and 36, the Xenon filter substantially changes certain portions of the spectral distribution of the radiation from the Xenon arc lamp. The Xenon shaping filter, in effect, takes the output from the Xenon arc lamp and shapes it so that its spectral distribution corresponds to sunlight in space from 300 to approximately 750 millimicrons.

The tungsten shaping filters 19 and 20 in the same way change the spectral distribution of the radiation from the tungsten lamp from approximately 750 millimicrons to 1300 millimicrons. From the curve 37, it can be seen that the tungsten shaping filters 19 and 20 pass as much light as possible at approximately 650 millimicrons and cut off to a level of approximately 20 to 30% at 1200 millimicrons. It can be seen that the tungsten shaping filters, in fact, actually change the slope of the curve 33 so that the slope is always negative as shown by the curve 37 rather than positive for a substantial portion of the spectrum as shown by the curve 33 in FIGURE 8.

The effects of the cold mirror 21 and the combining mirror 22 are shown by the dashed line curves 38 and 39. Substantially all radiation from 300 to approximately 700 millimicrons is reflected and thereafter a sharp transition occurs, which is represented by portions 38*a* and 39*a* of the curves 38 and 39, in the range of approximately 50 millimicrons in the 700 millimicron region. Above the 700 millimicron region, substantially all of the radiation is transmitted.

The amount of separation between the transition regions of the curves 38 and 39 for the cold mirrors is determined by the slope of the transition portions 38*a* and 39*a*. The slopes for the portions 38*a* and 39*a* are chosen so that the end of the first transition region is completed before the transition region for the second mirror commences to eliminate any possible cut-outs. Thus, it can be seen that the smaller the slope of the transition portions of the curves, the greater the separation required and the steeper the slope, the lesser the separation required.

By way of example, a light source incorporating our invention had the spectral distribution shown by the dashed line curve 41 in FIGURE 10. Johnson's Curve is shown by curve 42 for comparison purposes. By comparing curve 41 to curve 42, it can be seen that curve 41 closely approximates curve 42 so that the output from our light source very closely represents the output of the sun outside the earth's atmosphere and at no wavelength does it vary more than ±20%.

It will be noted that there are a few slight differences. Most of these differences can be eliminated. However, the cost and difficulty of doing so does not ordinarily warrant doing the same.

Although we have disclosed our solar simulator as being formed by reflecting the desired Xenon part and transmitting the desired tungsten part, the same results can be obtained by interchanging the Xenon and tungsten lamps and reflecting the desired tungsten part and transmitting the desired Xenon part. We have found it preferable to reflect the Xenon part and transmit the tungsten part because it is easier to coat the mirrors 21 and 22 to work in this manner rather than in the opposite manner.

Another embodiment of our invention is shown in FIGURE 11 and consists of a tungsten lamp 51 with its reflector 52 and a Xenon lamp 53 with its reflector 54. The beam from the tungsten lamp 51 passes through a converging lens 56 and a collimating lens 57. It then passes through a tungsten shaping filter 58 of the type hereinbefore described. The beam from the Xenon lamp 53 passes through a collimating lens 61 and then through a hot mirror 62 or, in other words, a mirror which reflects infrared and transmits the radiation of shorter wavelengths. Such a mirror is of a type well known to those skilled in the art. The beam then passes through a Xenon shaping filter 63 of a type hereinbefore described. The tungsten and Xenon beams, after they have passed through the shaping filters 58 and 63, are combined by a cold mirror combiner 64 and directed to illuminate a plane test area 66 with radiation equal in intensity and spectral content to that provided by the sun in space. The cold mirror combiner 64 transmits the desired spectral portion and reflects the undesired spectral portion of the radiation from the tungsten source and reflects the desired spectral portion and transmits the undesired spectral portion from the Xenon source.

As can be seen in this embodiment, only one cold mirror combiner is required. Also, it can be seen that the beams emanating from the sources 51 and 53 are at an angle with respect to each other, whereas the beams emanating from the sources 11 and 12 in FIGURE 1 are parallel.

It is apparent from the foregoing that we have utilized at least two different light sources to match a radiation having a certain spectral content and intensity. The use of two light sources with a combiner makes it possible to have multiple variables which can be utilized to advantage in obtaining the proper match. With so many variables, it normally is easier to obtain the proper match than would be the case if a single light source were utilized.

It is also apparent from the foregoing that two cold mirrors are utilized to minimize as much as possible the near infrared radiation from the Xenon arc lamp. In addition, the use of two cold mirrors makes the physical arrangement simpler because both of the light beams can travel in parallel paths. Also, it is apparent from the foregoing that by utilizing two cold mirrors in which the first mirror has a cut-off which is higher than the second mirror, we can be sure that the spectral content of radiation that arrives at the second mirror from the first mirror is uniform for wavelengths near the combining wavelength to minimize the possibility of holes in the spectral output.

It is apparent from the foregoing that we have provided a light source which has a spectral distribution and intensity equalling that of the sun outside the earth's atmosphere. It also has stability in time to permit quantitative measurements to be made utilizing it as a test source. It also gives a uniform distribution of energy over a predetermined test area.

Although we have described our invention used primarily as a solar simulator, it is readily apparent that our invention can be utilized for providing any type of light source having a predetermined spectral distribution in which it is desirable to use at least two light sources having different spectral distributions and combining the same to produce the desired light output.

We claim:

1. In a light source for illuminating a plane test area with radiation substantially equal in intensity and spectral content to that provided by the sun at the outer edge of the earth's atmosphere, a first light source having radiation in a predetermined spectral region, a second light source having radiation in a predetermined spectral region different from the radiation in the spectral region of the first light source, a first cold mirror positioned in front of and receiving the radiation from the first light source and having means thereon for reflecting a desired portion of the radiation from the first light source and transmitting the undesired portion of the radiation from the first light source, and a second cold mirror positioned forward of said light source transmitting a desired portion of the radiation from the second light source and reflecting the undesired portion of the radiation from the second light source, said first and second cold mirrors being positioned so that the second cold mirror receives radiation reflected from the first cold mirror and reflects the same while transmitting the desired portion of the radiation from the second light source to thereby combine the desired portions of the radiation from the first and second light sources.

2. A light source as in claim 1 together with a shaping filter disposed between the first light source and the first mirror and a second shaping filter disposed between the second light source and the second cold mirror.

3. A light source as in claim 1 wherein said first light source is a Xenon arc lamp and said second light source is a tungsten lamp.

4. A light source as in claim 2 wherein the first cold mirror has a coating which has a cut-off wavelength which is higher than the second cold mirror.

5. A light source as in claim 3 together with an attenuator disposed between the tungsten lamp and the second cold mirror.

6. A light source as in claim 4 wherein the first mirror highly reflects wavelengths from 300 millimicrons to 700 millimicrons and highly transmits wavelengths above 700 millimicrons and wherein the second mirror highly reflects wavelengths from 300 millimicrons to 650 millimicrons and highly transmits wavelengths above 650 millimicrons.

7. In a solar simulator, a Xenon arc lamp, a reflector for directing radiation from the Xenon arc lamp along a first predetermined path a tungsten lamp, a reflector for directing radiation from the tungsten lamp along a second predetermined path, a first cold mirror obliquely intersecting said first predetermined path and having a coating or filter which highly reflects wavelengths from 300 millimicrons to approximately 700 millimicrons and highly transmits wavelengths above 700 millimicrons for reflecting the shorter wavelength radiation from the Xenon arc lamp and transmitting the longer wavelength radiation from the Xenon arc lamp, a second cold mirror obliquely intersecting said second predetermined path and having a coating which highly reflects wavelengths from 300 millimicrons to approximately 650 millimicrons and highly transmits wavelengths above 650 millimicrons to transmit the longer wavelength radiation from the tungsten lamp and reflect the shorter wavelength radiation from the tungsten lamp, said first and second cold mirrors being arranged so that the reflected radiation from the Xenon lamp is reflected from the first cold mirror onto the second cold mirror and is then reflected from the second cold mirror to combine with the transmitted radiation from the tungsten lamp.

8. A solar simulator as in claim 7 together with a Xenon shaping filter disposed in said first predetermined path between the Xenon arc lamp and the first cold mirror and a tungsten shaping filter disposed in said second predetermined path between the tungsten lamp and the second cold mirror.

9. In a light source for illuminating a test area, a first light source having a predetermined spectral distribution, a second light source having a predetermined spectral distribution different from the spectral distribution of the first light source, said first light source being a Xenon source and said second light source being a tungsten source and means for combining the radiation from the first and second light sources positioned forward of said light sources; said last named means including a cold mirror which highly reflects at a wavelength from 300 millimicrons to approximately 700 millimicrons and highly transmits above a wavelength of 700 millimicrons and an additional cold mirror receiving radiations from the Xenon source, said additional cold mirror being positioned to reflect the radiations of the shorter wavelengths from the Xenon source onto the first named cold mirror for directing toward said test areas.

10. A light source as in claim 9 wherein said first named and additional mirrors transmit in the region of 800–1000 millimicrons to thereby substantially attenuate any radiation in the 800–1000 millimicron region from the Xenon source.

11. A light source for illuminating a test area, a first light source producing radiation with a predetermined spectral distribution, means for directing radiation from the first light source along a first predetermined path, a second light source producing radiation with a predetermined spectral distribution different from the spectral distribution of the first light source, means for directing radiation from the second light source along a second predetermined path, means disposed across said first and second predetermined paths for transmitting some radiation from the first light source to said test area and for transmitting some radiation from the second light source to said test area and directing some radiation from said first light source and from said second light source away from said test area, and said means disposed in first and second predetermined paths including a first cold mirror extending obliquely across said first predetermined path to reflect some radiation and a second cold mirror extending obliquely across a second predetermined path, said first and second cold mirrors being positioned so that the reflected radiation of said first cold mirror is directed on to the said second cold mirror and reflected by said second cold mirror to the test area.

12. A light source as in claim 11 together with a shaping filter disposed across said first predetermined path between said first cold mirror and a first light source and a filter disposed across said second predetermined path between said second cold mirror and said second light source.

References Cited by the Examiner

UNITED STATES PATENTS 2,190,294 2/40 Mili ---------------------- 88—24

2,852,980 9/58 Schroder.
3,005,042 10/61 Horsley ------------------ 88—23

FOREIGN PATENTS 221,519 5/59 Australia.

NORTON ANSHER, *Primary Examiner.*